(12) United States Patent
Hall et al.

(10) Patent No.: US 7,504,963 B2
(45) Date of Patent: Mar. 17, 2009

(54) SYSTEM AND METHOD FOR PROVIDING ELECTRICAL POWER DOWNHOLE

(76) Inventors: David R. Hall, 2185 S. Larsen Pkwy., Provo, UT (US) 84606; Jim Shumway, 2185 S. Larsen Pkwy., Provo, UT (US) 84606

( * ) Notice: Subject to any disclaimer, the term of this patent is extended or adjusted under 35 U.S.C. 154(b) by 118 days.

(21) Appl. No.: 11/739,344

(22) Filed: Apr. 24, 2007

(65) Prior Publication Data
US 2007/0194948 A1    Aug. 23, 2007

Related U.S. Application Data

(63) Continuation-in-part of application No. 11/421,387, filed on May 31, 2006, which is a continuation-in-part of application No. 11/421,357, filed on May 31, 2006, now Pat. No. 7,382,273, which is a continuation-in-part of application No. 11/133,905, filed on May 21, 2005, now Pat. No. 7,277,026.

(51) Int. Cl.
*G01V 3/06* (2006.01)

(52) U.S. Cl. ............... 340/854.8; 340/854.9; 340/855.1; 340/855.8

(58) Field of Classification Search ............... 340/854.9, 340/855.1, 855.8
See application file for complete search history.

(56) References Cited

U.S. PATENT DOCUMENTS

| | | | |
|---|---|---|---|
| 2,414,719 A | 1/1947 | Cloud | |
| 3,967,201 A | 6/1976 | Rorden | |
| 4,416,494 A | 11/1983 | Watkins | |
| 4,785,247 A | 11/1988 | Meador | |
| 4,806,928 A | 2/1989 | Veneruso | |
| 5,008,664 A * | 4/1991 | More et al. | 340/854.8 |
| 5,337,002 A | 8/1994 | Mercer | |
| 6,223,826 B1 | 5/2001 | Chau | |
| 6,367,564 B1 | 4/2002 | Mills | |
| 6,392,317 B1 | 5/2002 | Hall | |
| 6,446,728 B2 | 9/2002 | Chau | |
| 6,651,755 B1 | 11/2003 | Kelpe | |
| 6,655,464 B2 | 12/2003 | Chau | |
| 6,670,880 B1 | 12/2003 | Hall | |
| 6,717,501 B2 | 4/2004 | Hall | |
| 6,739,413 B2 | 5/2004 | Sharp | |
| 6,799,632 B2 | 10/2004 | Hall | |
| 6,821,147 B1 | 11/2004 | Hall | |
| 6,830,467 B2 | 12/2004 | Hall | |
| 6,844,498 B2 | 1/2005 | Hall | |

(Continued)

*Primary Examiner*—Timothy Edwards, Jr.
*Assistant Examiner*—Hung Q Dang
(74) *Attorney, Agent, or Firm*—Daniel P. Nelson; Tyson Wilde

(57) ABSTRACT

A system for transmitting power to components of a downhole drill string is disclosed in one embodiment of the invention as including a power source providing an alternating current at a first frequency. A rectifier is provided to convert the alternating current to direct current. An inverter converts the direct current to an alternating current at a second frequency, different from the first frequency, and more efficient for power transmission. An inductive coupler converts the alternating current at the second frequency to an alternating magnetic flux for transmission across a tool joint of a downhole drill string. The magnetic flux may be detected by another inductive coupler, magnetically coupled to the first inductive coupler, to convert the alternating magnetic flux back to an alternating current at the second frequency.

18 Claims, 8 Drawing Sheets

U.S. PATENT DOCUMENTS

| | | |
|---|---|---|
| 6,845,822 B2 | 1/2005 | Chau |
| 6,888,473 B1 | 5/2005 | Hall |
| 6,913,093 B2 | 7/2005 | Hall |
| 6,929,493 B2 | 8/2005 | Hall |
| 6,945,802 B2 | 9/2005 | Hall |
| 6,968,611 B2 | 11/2005 | Hall |
| 7,028,779 B2 | 4/2006 | Chau |
| 7,150,329 B2 | 12/2006 | Chau |
| 2001/0040379 A1* | 11/2001 | Schultz et al. .............. 290/1 R |
| 2004/0104797 A1 | 6/2004 | Hall |
| 2004/0118608 A1 | 6/2004 | Hall |
| 2004/0145482 A1 | 7/2004 | Hall |
| 2004/0150532 A1 | 8/2004 | Hall |
| 2004/0164636 A1 | 8/2004 | Hall |
| 2004/0164833 A1 | 8/2004 | Hall |
| 2004/0216847 A1 | 11/2004 | Hall |
| 2004/0244816 A1 | 12/2004 | Hall |
| 2004/0244964 A1 | 12/2004 | Hall |
| 2004/0246142 A1 | 12/2004 | Hall |
| 2005/0001730 A1 | 1/2005 | Hall |
| 2005/0001735 A1 | 1/2005 | Hall |
| 2005/0001738 A1 | 1/2005 | Hall |
| 2005/0035874 A1 | 2/2005 | Hall |
| 2005/0035875 A1 | 2/2005 | Hall |
| 2005/0035876 A1 | 2/2005 | Hall |
| 2005/0036507 A1 | 2/2005 | Hall |
| 2005/0039912 A1 | 2/2005 | Hall |
| 2005/0045339 A1 | 3/2005 | Hall |
| 2005/0046590 A1 | 3/2005 | Hall |
| 2005/0067159 A1 | 3/2005 | Hall |
| 2005/0070144 A1 | 3/2005 | Hall |
| 2005/0082082 A1 | 4/2005 | Hall |
| 2005/0092499 A1 | 5/2005 | Hall |
| 2005/0093296 A1 | 5/2005 | Hall |
| 2005/0095827 A1 | 5/2005 | Hall |
| 2005/0115717 A1 | 6/2005 | Hall |
| 2005/0145406 A1 | 7/2005 | Hall |
| 2005/0150853 A1 | 7/2005 | Hall |
| 2005/0161215 A1 | 7/2005 | Hall |
| 2005/0173128 A1 | 8/2005 | Hall |
| 2005/0212530 A1 | 9/2005 | Hall |
| 2005/0284662 A1 | 12/2005 | Hall |
| 2006/0048586 A1 | 3/2006 | Hall |
| 2006/0236160 A1 | 10/2006 | Hall |

* cited by examiner

SYSTEM AND METHOD FOR PROVIDING ELECTRICAL POWER DOWNHOLE

CROSS REFERENCE TO RELATED APPLICATIONS

This application is a continuation in-part of U.S. application Ser. No. 11/421,387 filed on May 31, 2006 and entitled, "Wired Tool String Component." U.S. application Ser. No. 11/421,387 is a continuation in-part of U.S. application Ser. No. 11/421,357 filed on May 31, 2006 now U.S. Pat. No 7,382,273 and entitled, "Wired Tool String Component." U.S. application Ser. No. 11/421,357 is a continuation-in-part of U.S. application Ser. No. 11/133,905 filed on May 21, 2005 now U.S. Pat. No. 7,277,026 and entitled, "Downhole Component with Multiple Transmission Elements." Both applications are herein incorporated by reference for all that they contain.

BACKGROUND OF THE INVENTION

The present invention relates to downhole drilling, and more particularly, to systems and methods for transmitting power to components of a downhole drill string.

Downhole sensors, tools, telemetry components and other electronic components continue to increase in both number and complexity in downhole drilling systems. Because these components require power to operate, the need for a reliable energy source to power these downhole components is becoming increasingly important. Constraints imposed by downhole tools and the harsh downhole environment significantly limit options for generating and providing power to downhole components.

Batteries provide one potential energy source to power downhole components. Batteries, however, may be hindered by their inherently finite life and the need for frequent replacement and/or recharging. This may be especially problematic in downhole drilling applications where access to batteries requires tripping and disassembly of the drill string. Battery function may also be impaired by extreme temperatures, pressures, or other conditions found downhole. Many types of batteries may be unable to reliably operate in downhole conditions. Furthermore, batteries may be required everywhere electronic equipment is located downhole, requiring large numbers of batteries and significant time for installation and replacement.

Another approach is to transmit power along the drill string using cables or other transmission media. For example, power may be generated at or near the ground's surface and then transmitted to various downhole components along the drill string. This approach, however, may also have its problems and limitations. Because a drill string may extend 20,000 feet or more into the ground, power transmitted along transmission lines may attenuate to an unacceptable level before it reaches its destination.

Attenuation may occur not only in transmission lines, but in components used to transmit power across tool joints of a drill string. Because a drill string may include many hundreds of sections of drill pipe and a roughly equal number of tool joints, a power signal may attenuate significantly after traveling a relatively short distance along the drill string.

In view of the foregoing, what is needed is a system and method for reliably transmitting power to downhole sensors, tools, telemetry components and other electronic components in a downhole drilling system. Ideally, such a system and method would mitigate the problems with signal attenuation which may be present in some power transmission systems. A suitable system and method should also be able to provide reliable operation in extreme temperatures, pressures, and corrosive conditions encountered downhole. Further needed is a system and method for generating power in closer proximity to downhole components.

SUMMARY OF THE INVENTION

Consistent with the foregoing, and in accordance with the invention as embodied and broadly described herein, a system for transmitting power to components of a downhole drill string is disclosed in one embodiment of the invention as including a power source providing an alternating current at a first frequency. A rectifier is provided to convert the alternating current to direct current. An inverter converts the direct current to an alternating current at a second frequency, different from the first frequency, and more efficient for power transmission. An inductive coupler then converts the alternating current at the second frequency to an alternating magnetic flux for transmission across a tool joint of a downhole drill string. The magnetic flux may be detected by another inductive coupler, magnetically coupled to the first inductive coupler, to convert the alternating magnetic flux back to an alternating current at the second frequency.

In selected embodiments, the power source is a downhole electrical power generator. In selected embodiments, the first frequency is between about 100 Hz and about 2 kHz. In other embodiments, the first frequency is between about 300 Hz and about 1 kHz. Similarly, in certain embodiments, the second frequency is between about 2 kHz and about 2 MHz. In other embodiments, the second frequency is between about 10 kHz and about 500 kHz.

One or more additional rectifiers may be connected downstream from the inverter to receive the alternating current at the second frequency and convert the alternating current to direct current. This direct current may be used to power one or more downhole sensors, tools, telemetry components, or other electronic components.

In selected embodiments, the inductive couplers may each include a conductive coil having a number of turns. In certain embodiments, the coils of each inductive coupler have at least two turns. In selected embodiments, the coils of each inductive coupler have an equal number of turns. In other embodiments, the coil of one inductive coupler has a greater number of turns than the coil of the other inductive coupler.

In another aspect of the invention, a method for transmitting power to components of a downhole drill string includes generating an alternating current at a first frequency. This alternating current is converted to direct current. The direct current is then converted to an alternating current at a second frequency, different from the first frequency, which is more efficient for power transmission. This alternating current is then converted to an alternating magnetic flux for transmission across a tool joint of a downhole drill string.

In selected embodiments, generating an alternating current at a first frequency includes generating the alternating current in a downhole environment. In selected embodiments, the first frequency is between about 100 Hz and about 2 kHz. In other embodiments, the first frequency is between about 300 Hz and about 1 kHz. In certain embodiments, the second frequency is between about 2 kHz and about 2 MHz. In other embodiments, the second frequency is between about 10 kHz and about 500 kHz.

In certain embodiments, the method further includes converting the alternating magnetic flux back to an alternating current at the second frequency. In selected embodiments, this may include stepping up a voltage of the alternating current. The alternating current may then be converted to direct current for use by various downhole components such as downhole sensors, tools, telemetry components, or other electronic components.

In another aspect of the invention, a method for transmitting power between components of a downhole drill string includes providing an alternating current having a frequency between about 2 kHz and about 2 MHz. This alternating current may then be converted to an alternating magnetic flux for transmission across a tool joint of a downhole drill string.

The present invention provides novel systems and methods for transmitting power to components of a downhole drill string. The features and advantages of the present invention will become more fully apparent from the following description and appended claims, or may be learned by the practice of the invention as set forth hereinafter.

BRIEF DESCRIPTION OF THE DRAWINGS

In order to describe the manner in which the above-recited features and advantages of the present invention are obtained, a more particular description of apparatus and methods in accordance with the invention will be rendered by reference to specific embodiments thereof, which are illustrated in the appended drawings. Understanding that these drawings depict only typical embodiments of the present invention and are not, therefore, to be considered as limiting the scope of the invention, apparatus and methods in accordance with the present invention will be described and explained with additional specificity and detail through the use of the accompanying drawings in which.

DETAILED DESCRIPTION OF THE INVENTION

It will be readily understood that the components of the present invention, as generally described and illustrated in the Figures herein, could be arranged and designed in a wide variety of different configurations. Thus, the following more detailed description of the embodiments of systems and methods in accordance with the present invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Figure 1:
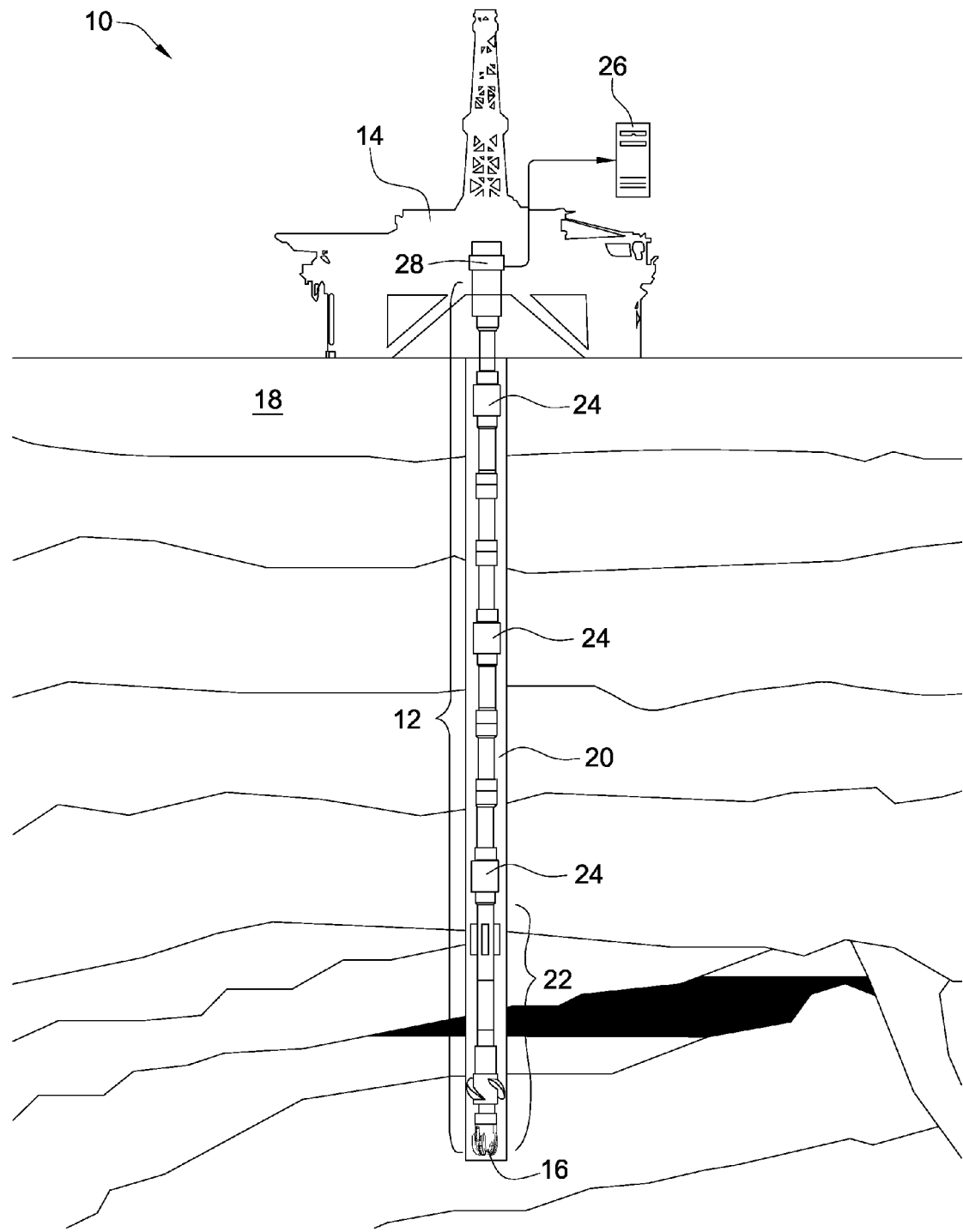
FIG. 1 is a profile view of one embodiment of a drill string.

Referring to FIG. 1, one embodiment of a downhole drilling system 10 for use with the present invention includes a drill string 12 having multiple sections of drill pipe and other downhole tools. The drill string 12 is typically rotated by a drill rig 14 to turn a drill bit 16 that is loaded against the earth 18 to form a borehole 20. Rotation of the drill bit 16 may alternatively be provided by other downhole tools such as drill motors or drill turbines located adjacent to the drill bit 16.

The drill string 12 includes a bottom hole assembly 22 which may include the drill bit 16 as well as sensors and other downhole tools such as logging-while-drilling ("LWD") tools, measurement-while-drilling ("MWD") tools, diagnostic-while-drilling ("DWD") tools, or the like. The bottomhole assembly 22 may also include other downhole tools such as heavyweight drill pipe, drill collar, crossovers, mud motors, directional drilling equipment, stabilizers, hole openers, sub-assemblies, under-reamers, drilling jars, drilling shock absorbers, and other specialized devices.

While drilling, a drilling fluid is typically supplied under pressure at the drill rig 14 through the drill string 12. The drilling fluid typically flows downhole through the central bore of the drill string 12 and then returns uphole to the drill rig 14 through the annulus 20. Pressurized drilling fluid is circulated around the drill bit 16 to provide a flushing action to carry cuttings to the surface.

To transmit information at high speeds along the drill string 12, a telemetry network comprising multiple network nodes 24 may be integrated into the drill string 12. These network nodes 24 may be used as repeaters to boost a data signal at regular intervals as the signal travels along the drill string 12. The nodes 24 may also be used to interface with various types of sensors to provide points for data collection along the drill string 12. The telemetry network may include a top-hole server 26, also acting as a network node, which may interface with the drill string 12 using a swivel device 28 for transmitting data between the drill string 12 and the server 26. The top-hole server 26 may be used to transfer data and tool commands to and from multiple local and remote users in real time. To transmit data between each of the nodes 24 and the server 26, data couplers and high-speed data cable may be incorporated into the drill pipe and other downhole tools making up the drill string 12. In selected embodiments, the data couplers may be used to transmit data across the tool joint interfaces by induction and without requiring direct electrical contact between the couplers.

One embodiment of a telemetry network is described in patent application Ser. No. 6,670,880 and entitled Downhole Data Transmission System, having common inventors with the present invention, which this specification incorporates by reference. The telemetry network described in the above-named application enables high-speed bi-directional data transmission along the drill string 12 in real-time. This provides various benefits including but not limited to the ability to control downhole equipment, such as rotary-steerable systems, instantaneously from the surface. The network also enables transmission of full seismic waveforms and logging-while-drilling images to the surface in real time and communication with complex logging tools integrated into the drill string 12 without the need for wireline cables. The network further enables control of downhole tools with precision and in real time, access to downhole data even during loss of circulation events, and monitoring of pressure conditions, hole stability, solids movement, and influx migration in real time.

Figure 2:
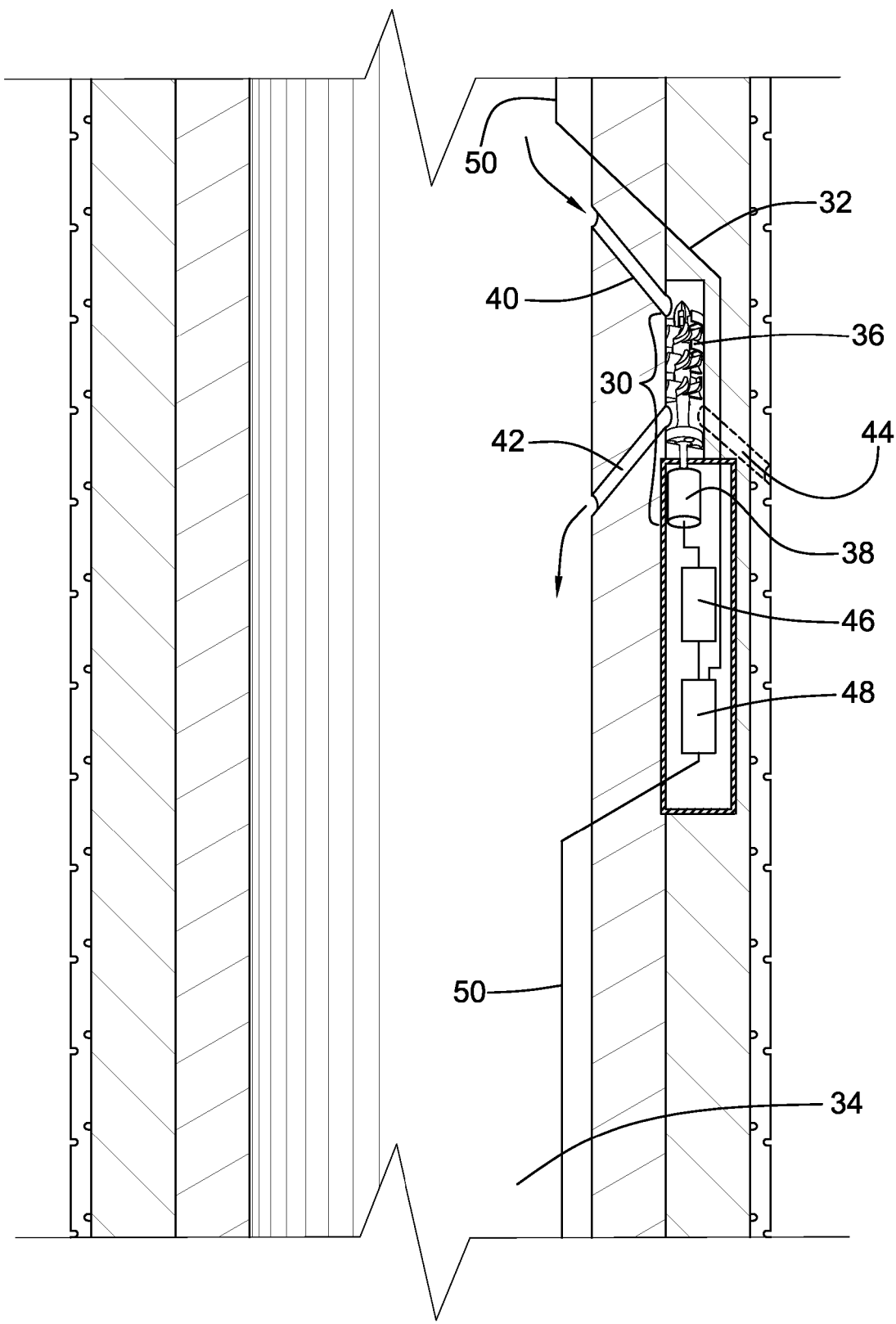
FIG. 2 is a cross-sectional view of one embodiment of a downhole micro-generator installed in the wall of a downhole tool.

Referring to FIG. 2, because downhole sensors, tools, telemetry and other electronic components require power to operate, a need exists for a reliable energy source to power downhole components. In certain embodiments, a downhole electric power generator 30 may be used to provide power to downhole components. In certain embodiments, the generator 30 may be a micro-generator 30 mounted in the wall 32 of a downhole tool to avoid obstructing the tool's central bore 34.

In general, a downhole generator 30 in accordance with the invention may include a turbine 36 mechanically coupled to an electrical generator 38. The turbine 36 may receive, though an inlet channel 40, a moving downhole fluid, such as drilling mud. This downhole fluid may turn blades of the turbine 36 to produce rotational energy (e.g., by rotating a shaft, etc.). This rotational energy may be used to drive a generator 38 to produce electricity. The electrical power produced by the generator 38 may be used to power electrical devices such as sensors, tools, telemetry components, and other electronic components.

Once the turbine 36 has extracted the energy from the downhole fluids passing therethrough, the downhole fluids may be vented or expelled through an outlet channel 42. In selected embodiments, the outlet channel 42 may simply return the downhole fluid to the central bore 34 where it originated. In other embodiments, an outlet channel 44 (as indicated by the dotted lines) may be vented to the annulus between the downhole tool and the borehole wall. The greater pressure differential that exists between the central bore 34 and the annulus may be used to increase the speed of the fluid and thus provide additional energy transfer to the turbine 36. However, due to the risks of leaks or "wash outs," there may be reluctance on the part of some to provide a channel between the central bore 34 and the annulus. In such cases, the downhole fluid may be routed back into the central bore 34. One example of a downhole micro-generator which may be used with the present invention is described in patent application Ser. No. 7,190,084 and entitled Method and Apparatus for Generating Electrical Energy Downhole having common inventors with the present invention, which this specification incorporates by reference in its entirety.

In selected embodiments, the generator 30 is an AC generator 30 configured to produce an alternating current with a frequency between about 100 Hz and 2 kHz. More typically, the AC generator 30 is configured to produce an alternating current with a frequency between about 300 Hz and 1 kHz. The frequency of the alternating current is proportional to the rotational velocity of the turbine 36 and generator 38. Although generators 30 producing alternating currents with frequencies greater than 1 kHz are possible, such generators 30 may become less efficient at higher frequencies and thus may be undesirable.

As will be explained in more detail hereafter, due to the small size of inductive couplers (which function as small transformers) used to transmit power across the tool joints, an AC power signal having a frequency between about 300 Hz and 1 kHz may be unsuitable to efficiently transmit power across the tool joints using induction. In certain embodiments, an alternating current with a frequency between about 2 kHz and 2 MHz, and more ideally between about 10 kHz and 500 kHz may achieve more efficient power transmission across the tool joints. Thus, in selected embodiments, the frequency of the alternating current produced by the generator 30 may be shifted to a higher frequency to achieve more efficient power transmission.

To achieve this, a rectifier 46 may be used to convert the alternating current of the generator 38 to direct current. An inverter 48 may convert the direct current to an alternating current having a frequency between about 2 kHz and 2 MHz, and more ideally between about 10 kHz and 500 kHz. The inverter 48 may need to be a custom design since there are few if any commercially available inverters designed to produce an AC signal between about 400 Hz and 1 MHz. The alternating current at the higher frequency may then be transmitted through conductors 50 routed along the drill string 12. The power signal may be transmitted across tool joints to other downhole tools by way of inductive couplers, which will be explained in more detail in association with FIGS. 4 and 5.

Figure 3:
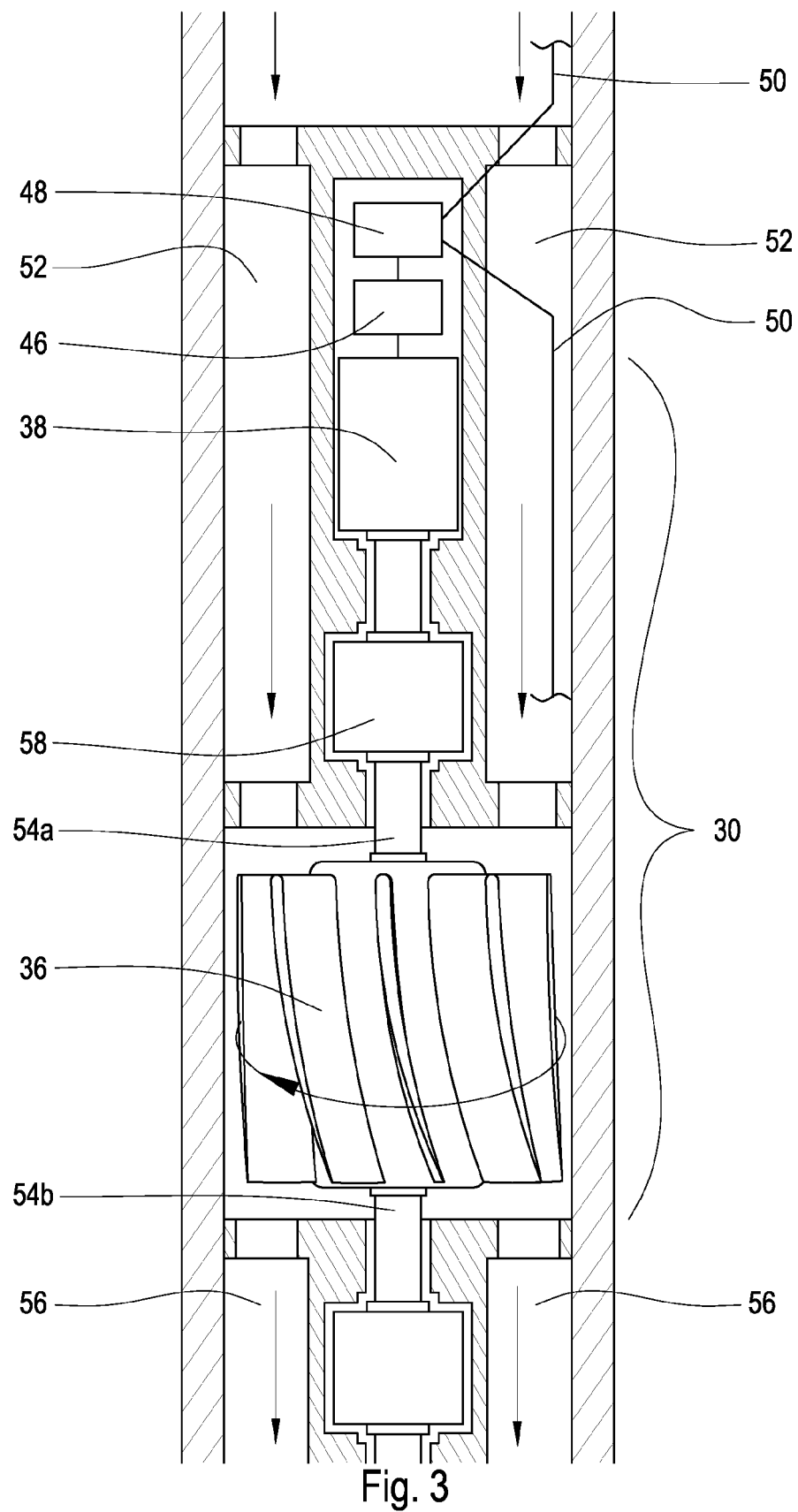
FIG. 3 is a cross-sectional view of one embodiment of an axially mounted generator installed in a downhole tool.

Referring to FIG. 3, in another embodiment, a downhole generator 30 may include an axially mounted generator 30 which may, for example, include an axially mounted turbine 36. Downhole drilling fluids, such as drilling mud, may be conveyed to the turbine 36 through one or more channels 52 incorporated into the downhole toot These fluids may exert a force on blades of the turbine 36 to produce rotational energy, which may, for example, be transferred to a shaft 54a. The shaft 54a maybe used to drive a generator 38 to produce electricity. In other embodiments, the turbine 36 may also drive a second shaft 54b to provide mechanical power to other downhole components.

Once the turbine 36 has extracted energy from downhole fluids passing therethrough, the downhole fluids may be routed through one or more outlet channels 56 incorporated into the downhole tool. The outlet channels 56 may route the downhole fluid back to a central bore of the drill string 12 where it may travel to other downhole tools such as mud motors and the drill bit 16.

In selected embodiments, a gear assembly 58 may be provided between the turbine 36 and the generator 38 to increase the rotational speed of the generator 38 relative to the turbine 36. For example, the gear assembly 58 may be designed such that the generator 38 rotates between about 1.5 and 10 times faster than the turbine 36. Such an increase in velocity may be used to increase the power generated by the generator 38 as well as increase the frequency of the alternating current produced by the generator 38. One example of an axially mounted downhole generator which may be used with the present invention is described in patent application Ser. No. 11/611,310 and entitled System for steering a drill string, having common inventors with the present invention, which this specification incorporates by reference.

Like the previous example, the frequency of the alternating current produced by the generator 38 may be between about 100 Hz and 2 kHz and more typically between about 300 Hz and 1 kHz. Because this frequency may be unsuitable to efficiently transmit power across the tool joints, the frequency of the alternating current may be shifted to a frequency between about 2 kHz and 2 MHz, and more ideally between about 10 kHz and 500 kHz to improve power transmission efficiency. To accomplish this, a rectifier 46 may be used to convert the alternating current of the generator 38 to direct current. An inverter 48 may be provided to convert the direct current to an alternating current having a frequency between about 2 kHz and 2 MHz, and more ideally between about 10 kHz and 500 kHz. Conductors 50 may be used to carry the alternating current to inductive couplers located at the tool joints.

Figure 4:
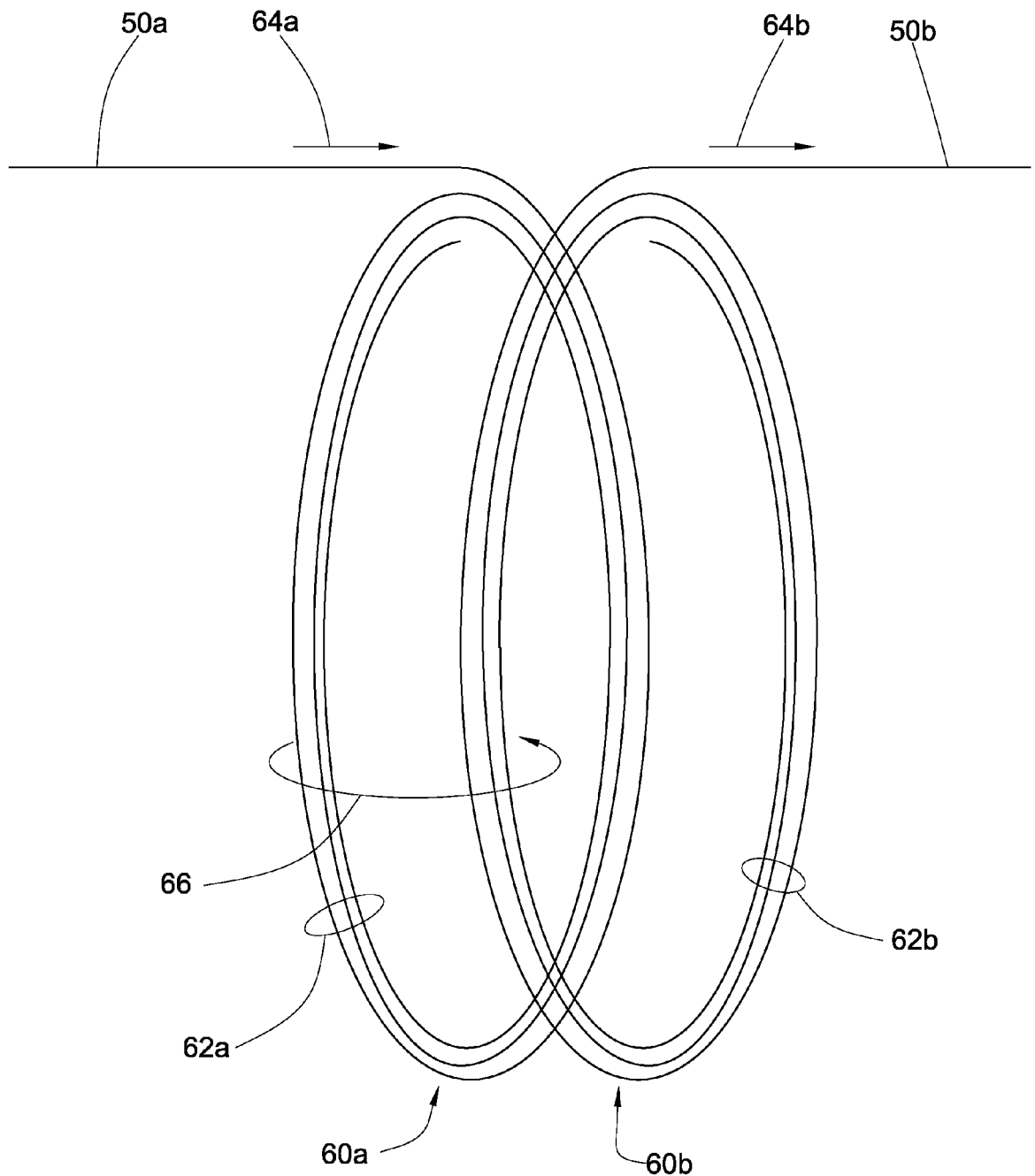
FIG. 4 is a representation of two inductive couplers having coils with multiple turns.

Referring to FIG. 4, a perspective representation of two inductive couplers 60a, 60b used to transmit power across a tool joint is illustrated. The inductive couplers 60a, 60b may include coils 62a, 62b of wire attached to conductors 50a, 50b, such as wires or cables, routed along downhole tools of the drill string 12. In certain embodiments, each inductive coupler 60a, 60b may be mounted in either the primary or secondary should of a downhole tool and may be brought into close proximity to one another when downhole tools are connected together.

In general, an electric current 64a carried by a first conductor 50a and the coil 62a will induce a magnetic field 66 around the coils 62a according to the right-hand rule. This magnetic field circles the coils 62b of the second inductive coupler 60b, inducing an electric current therein. This generates an electric current 64b in the second conductor 50b. In this way, a power signal may be transmitted across a tool joint without requiring direct electrical contact between the conductors 50a, 50b or coils 62a, 62b.

The size of the inductive couplers 60a, 60b is limited by the space available on the primary or secondary shoulder of the downhole tool in which they are mounted. As a result, the inductive couplers 60a, 60b may be quite small and have limited current carrying capacity. In order to increase the inductance of the inductive couplers 60a, 60b and thus their current carrying capacity, the coils 62a, 62b of inductive couplers used to carry power may include multiple turns. This contrasts with inductive couplers used to carry a data signal, which may utilize only a single turn.

Figure 5:
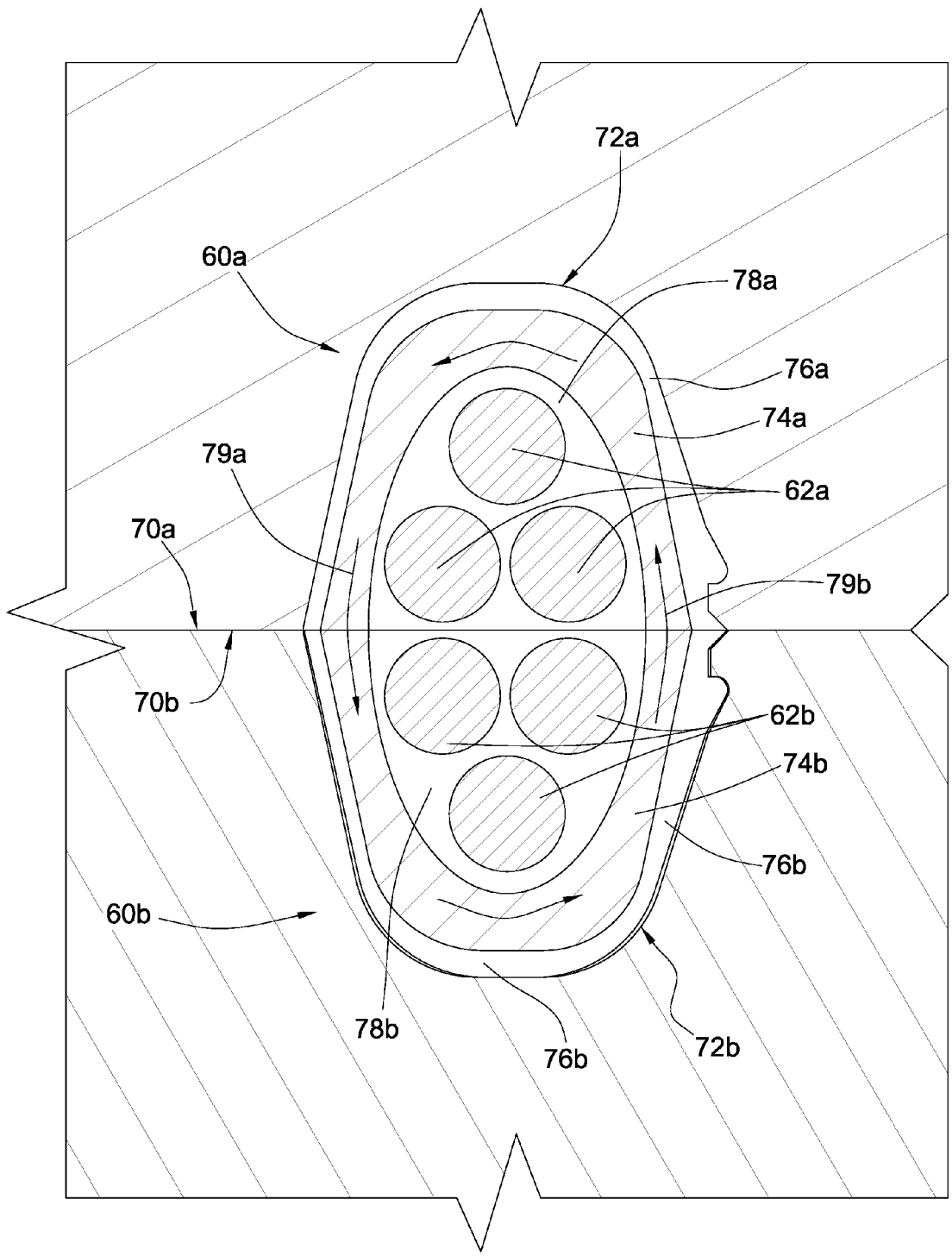
FIG. 5 is a cross-sectional view of one embodiment of inductive couplers installed in the shoulder of a downhole tool.

Referring to FIG. 5, a cross-sectional view of one embodiment of inductive couplers 60a, 60b mounted in the primary or secondary shoulders of downhole tools is illustrated. As shown, the inductive couplers 60a, 60b may reside within grooves 72a, 72b formed in the shoulders 70a, 70b of downhole tools. In selected embodiments, the inductive couplers 60a, 60b may include a magnetically-conductive, electrically-insulating (MCEI) material 74a, 74b, such as ferrite, formed in a U-shape. The MCEI material 74a, 74b may also include nickel, iron, or combinations thereof. The MCEI material 74a, 74b may, in certain embodiments, reside in conductive U-shaped rings 76a, 76b made of a material such as steel or stainless steel.

The electrically conductive coils 62a, 62b described in association with FIG. 4 may be routed through the U-shaped MCEI material 74a, 74b. These coils 62a, 62b ideally include multiple turns (e.g., three in the illustrated embodiment). In selected embodiments, the coils 62a, 62b are made of a conductive material insulated with a tough, flexible polymer such as high density polyethylene or polymerized tetrafluoroethane. Electrically conductive materials, such as copper, silver, or copper-coated steel, may form suitable coils 62a, 62b. Any space between the coils 62a, 62b and the MCEI material 74a, 74b may be filled with an electrically insulating material 78a, 78b to further insulate and protect the coils 62a, 62b. In selected embodiments, the inductive couplers 60a, 60b are positioned within the shoulders 70a, 70b such that when the drill string components are joined together, the MCEI material 74a, 74b of each coupler 60a, 60b makes contact. This may improve power transmission between the couplers 60a, 60b by improving the conduction of the magnetic flux created by the coils 62a, 62b within the MCEI material 74a, 74b and reducing energy leakage into surrounding materials.

Figure 6:
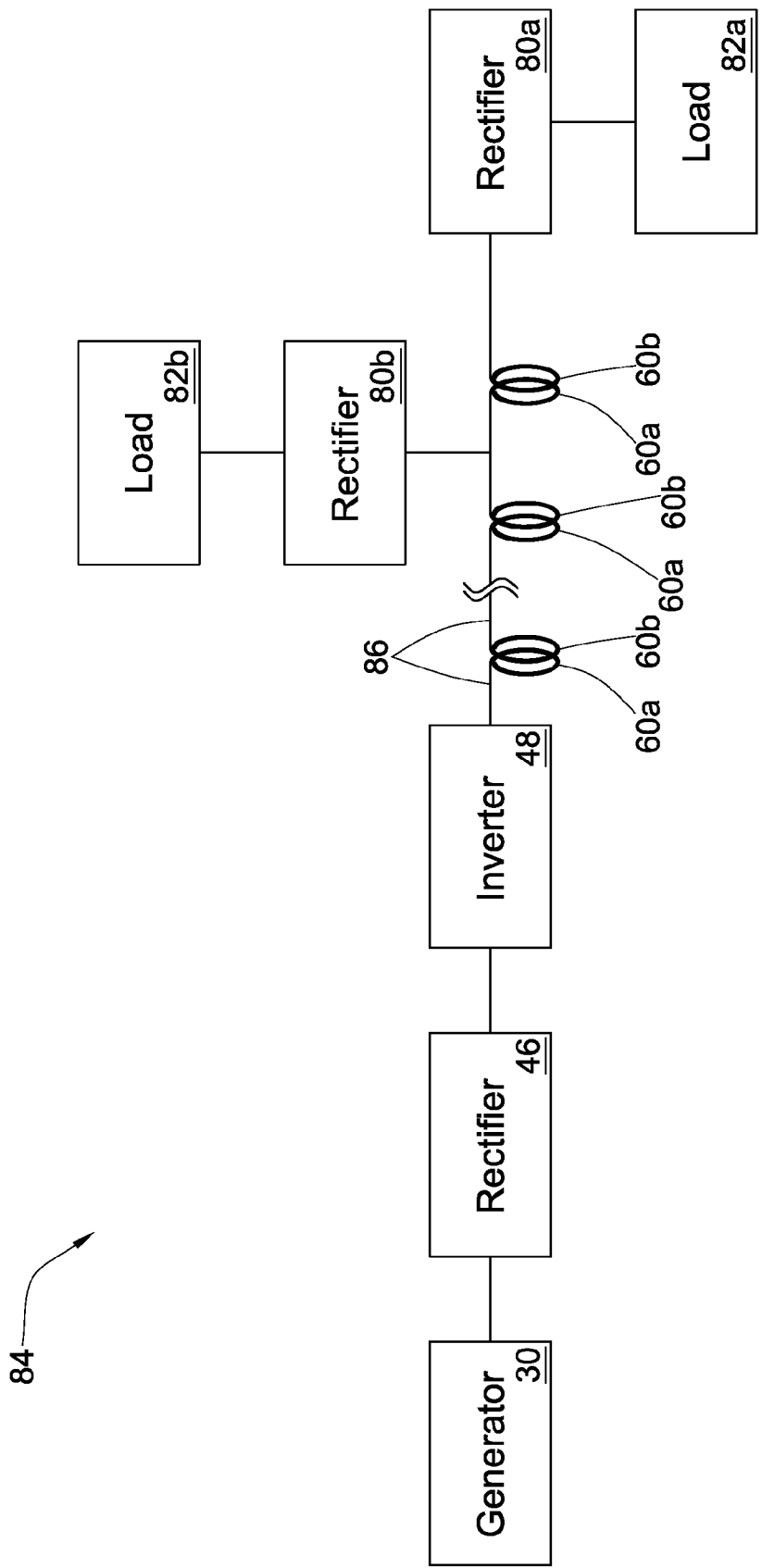
FIG. 6 is a high level block diagram of one embodiment of a system for transmitting power between components of a downhole drill string.

Referring to FIG. 6, one embodiment of a power generation and transmission system 84 in accordance with the invention is illustrated. As shown, the system 84 may include a downhole generator 30, such as a generator 30 illustrated in FIGS. 2 and 3, to produce an alternating current at a first frequency. A rectifier 46 may be provided to convert the alternating current to direct current. A suitable rectifier 46 may include, for example, a solid state diode bridge rectifier 46. In certain embodiments, the rectifier 46 may include various components (e.g., capacitor) to provide smoothing of the DC output.

An inverter 48 may be coupled to the rectifier 46 to convert the DC signal to an AC signal at a higher frequency. A suitable inverter 48 may, in certain embodiments, include a solid state "H" bridge inverter or center tapped half bridge inverter. As mentioned, the inverter 48 may generate an AC signal having a frequency above that produced by he generator 30 and suitable to efficiently transmit power across the inductive couplers 60a, 60b.

The inverter 48 may transmit power across one or multiple pairs of inductive couplers 60a, 60b in either direction (i.e., either uphole or downhole) from the generator 30. One or more downstream rectifiers 80a, 80b may receive the AC power signal and convert it to a DC signal where it may be used to power various loads 82a, 82b. Loads 82a, 82b may include, for example, downhole sensors, tools, telemetry components, and other electronic components that operate using DC current.

Because a power signal may lose power (e.g., 3 dB) each time it is transmitted across a pair of couplers 60a, 60b and along transmission cables 84 routed along the drill string 12, the system 84 may have a limited range. In selected embodiments, the system 84 may be limited to power transmission across ten or fewer pairs of inductive couplers 60a, 60b, which may correspond to ten or fewer downhole tools. In selected embodiments, the system 84 may be ideal to transmit power to downhole components connected in a bottom-hole assembly (BHA) or other group of connected downhole tools. In such a group, a single generator 30 may be used to power downhole components connected in the group.

Figure 7:
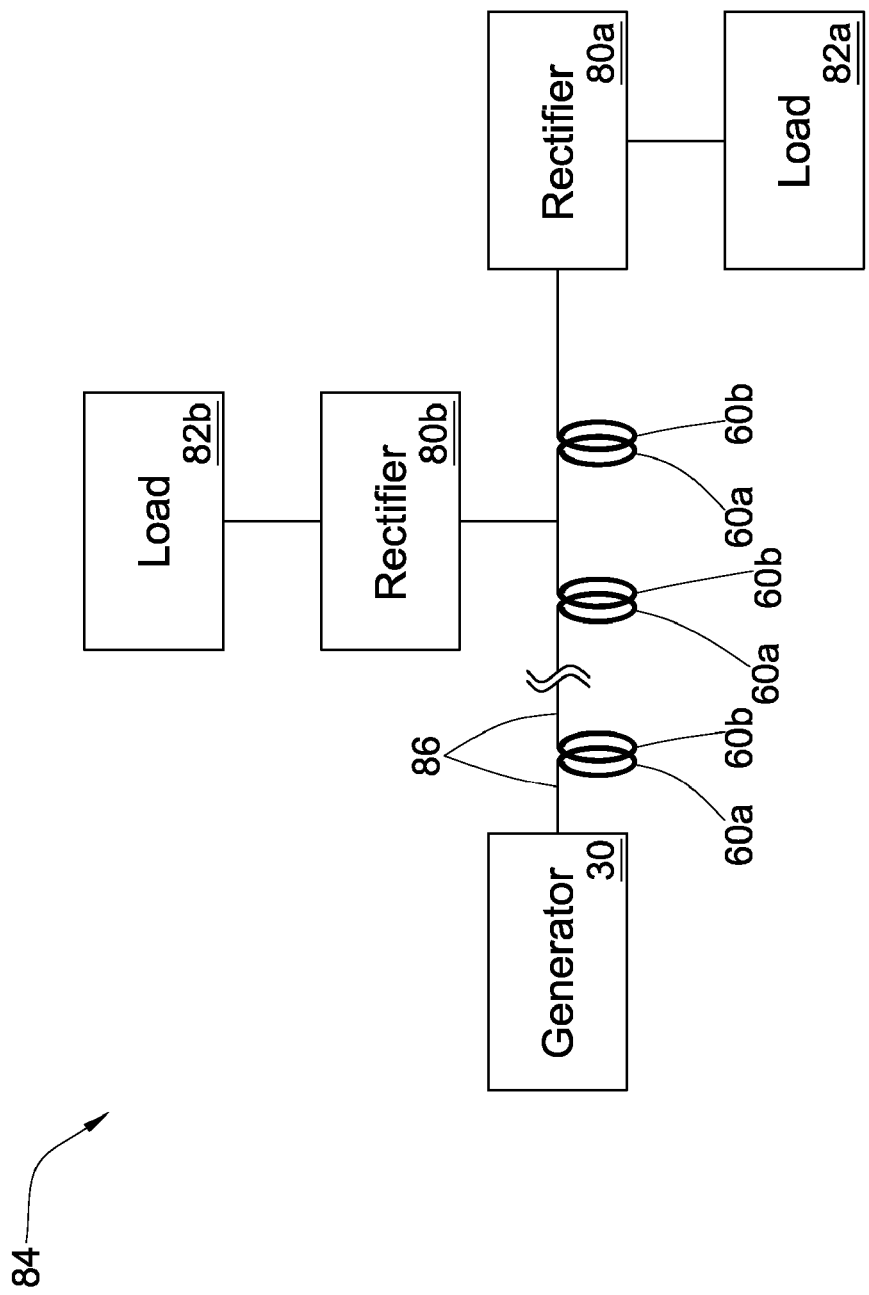
FIG. 7 is a high level block diagram of an alternative embodiment of a system for transmitting power between components of a downhole drill string.

Referring to FIG. 7, in another contemplated embodiment, a generator 30 may be provided that produces alternating current having a frequency suitable to efficiently transmit electrical power across the inductive couplers 60a, 60b. For example, the generator 30 may generate AC power at a frequency between about 2 kHz and 2 MHz and more ideally between about 10 kHz and 500 kHz. One or more downstream rectifiers 80a, 80b may receive the AC power signal and convert it to a DC signal for consumption by various loads 82a, 82b.

Figure 8:
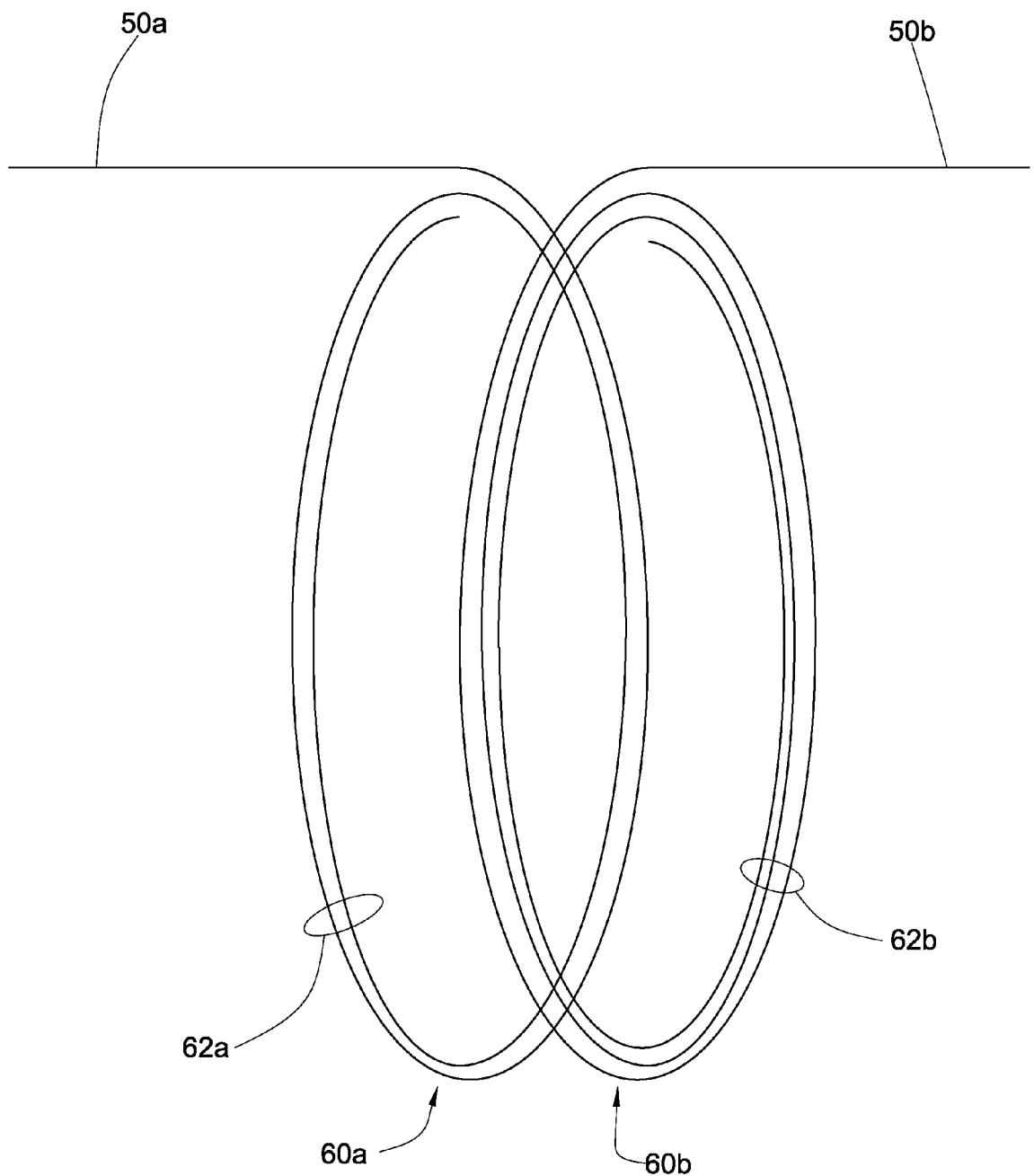
FIG. 8 is a perspective representation of inductive couplers having coils with different numbers of turns to compensate for voltage drops.

Referring to FIG. 8, in certain embodiments, it may be advantageous to periodically boost the voltage of a power signal transmitted along the drill string. Power transmitted along transmission lines may attenuate accordance with the transmission line's cross-sectional area, type of conductor, length, and temperature. Further attenuation occurs across the inductive couplers 60a, 60b. This attenuation may create an undesirable voltage drop, which may cause electronic equipment to malfunction or cease to operate.

To periodically boost the voltage of a power signal, each of the coils 62a, 62b may be designed to have a different number of turns. For example, a first inductive coupler 60a on a generator side of the circuit may have first number of turns (e.g., two in the illustrated embodiment) and a second inductive coupler 60b may have a second number of turns (e.g., three in the illustrated embodiments) greater than the first inductive coupler 60a. This may increase the voltage on the transmission line 50b while simultaneously decreasing the current induced on the transmission line 50b. The voltage increase may be adjusted by modifying the ratio of turns of the coils 62a, 62b.

The present invention may be embodied in other specific forms without departing from its essence or essential characteristics. The described embodiments are to be considered in all respects only as illustrative, and not restrictive. The scope of the invention is, therefore, indicated by the appended claims, rather than by the foregoing description. All changes within the meaning and range of equivalency of the claims are to be embraced within their scope.

We claim:

1. A system for transmitting power between components of a downhole drill string, the system comprising:
   a power source providing a first alternating current having a first frequency;
   a first rectifier to convert the first alternating current to direct current;
   an inverter to convert the direct current to a second alternating current having a second frequency different from the first frequency; and
   a first inductive coupler to convert the second alternating current to an alternating magnetic flux for transmission across a tool joint of a downhole drill string.

2. The system of claim 1, wherein the power source is a downhole electrical power generator.

3. The system of claim 1, wherein the first frequency is between about 100 Hz and about 2 kHz.

4. The system of claim 3, wherein the first frequency is between about 300 Hz and about 1 kHz.

5. The system of claim 1, wherein the second frequency is between about 2 kHz and about 2 MHz.

6. The system of claim 5, wherein the second frequency is between about 10 kHz and about 500 kHz.

7. The system of claim 1, further comprising a second inductive coupler, magnetically coupled to the first inductive coupler, to convert the alternating magnetic flux back to the second alternating current.

8. The system of claim 7, further comprising a second rectifier to convert the second alternating current to direct current.

9. The system of claim 7, wherein the first inductive coupler comprises a coil having a first number of turn, the second inductive coupler comprises a coil having a second number of turns, and the first and second numbers equal at least two.

10. The system of claim 9, wherein the first and second numbers are equal.

11. The system of claim 9, wherein the second number is greater than the first number to increase the voltage induced on the second inductive coupler.

12. A method for transmitting power between components of a downhole drill string, the method comprising:
   generating a first alternating current having a first frequency;
   converting the first alternating current to direct current;
   converting the direct current to a second alternating current having a second frequency different from the first frequency; and
   converting the second alternating current to an alternating magnetic flux for transmission across a tool joint of a downhole drill string.

13. The method of claim 12, wherein generating comprises generating in a downhole environment.

14. The method of claim 12, wherein the first frequency is between about 100 Hz and about 2 kHz.

15. The method of claim 12, wherein the second frequency is between about 2 kHz and about 2 MHz.

16. The method of claim 12, further comprising converting the alternating magnetic flux back to the second alternating current.

17. The method of claim 16, further comprising increasing a voltage of the second alternating current.

18. The method of claim 16, further comprising converting the second alternating current to direct current.

* * * * *